Figure 1:
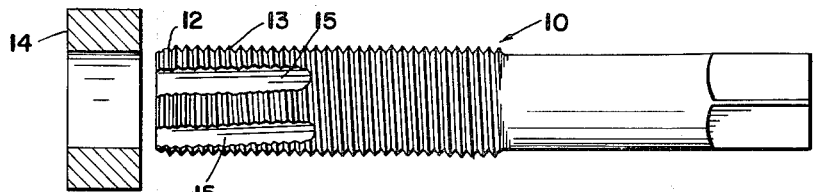

May 17, 1966  W. J. SHARON  3,251,080
TOOL FOR FORMING SCREW THREADS BY A CUTTING ACTION FOLLOWED
BY A SWAGING ACTION
Filed April 17, 1963  2 Sheets-Sheet 1

INVENTOR.
WILFRED J. SHARON
BY
John N. Wolfram
ATTORNEY

INVENTOR.
WILFRED J. SHARON
BY
John N. Wolfram
ATTORNEY

United States Patent Office 3,251,080
Patented May 17, 1966

3,251,080
TOOL FOR FORMING SCREW THREADS BY A CUTTING ACTION FOLLOWED BY A SWAGING ACTION
Wilfred J. Sharon, Lakewood, Ohio
Filed Apr. 17, 1963, Ser. No. 273,674
5 Claims. (Cl. 10—152)

This invention relates to a method and tool for forming screw threads and more particularly to a method and tool whereby a screw thread is formed in a work piece by first cutting an undersize thread with a section of a tool and then in a continuous operation burnishing or swaging it to proper size with another section of the same tool.

Heretofore it has been very difficult to produce threads in hard metals, such as stainless steel, by either cutting or swaging operations. With cut threads it is difficult to obtain a fine surface finish and consequently the threads formed by this method in hard materials will have high friction with a part with which they are threadedly assembled. In many applications, such as in tube fittings for air and space craft installations, high assembly torques are undesirable.

To overcome this problem, attempts have been made to form the threads by swaging, in which case the finish is smoother than on cut threads. However, it has not been practical to swage threads in stainless steel and similar metals because of their hardness. With these materials it is so difficult to move the metal for swaging the entire thread that the taps break quite easily.

It is an object of the present invention to provide a combination cutting and burnishing tap whose forward section cuts the thread form nearly to size and whose rearward portion burnishes the thread to final size so that the flanks of the thread will be work hardened to an appreciable depth for strengthening the thread and have a very smooth finish for reducing friction and the possibility of galling with the mated thread.

It is another object to provide a tap of the type described in which the cutting portion has the cutting teeth formed in such a manner that chips cut from the work piece are directed forwardly of the tap to preclude them from working their way to the burnishing teeth. This is accomplished by having the flutes which form the cutting edges on the cutting teeth at an angle with the longitudinal axis of the tap.

It is another object to provide a combination cutting and burnishing tap in which the cutting and burnishing teeth have working sections of predetermined diameter and relief sections progressing from a smaller diameter to the predetermined diameter, the relief sections on the cutting teeth being on the trailing end of the working sections as the tap is rotated in a work piece, and the relief sections on the burnishing teeth being on both the leading and trailing ends of the burnishing teeth.

It is another object to provide a tap of the type described in which both the cutting and burnishing teeth are provided with working sections, the cutting teeth and at least one of the burnishing teeth being chamfered on their outer diameters to facilitate starting of the threading operation, and one side of a flute forming cutting edges on the cutting teeth, the side of the flute extending at an angle with the longitudinal axis of the tap and intersecting the chamfered burnishing tooth and the cutting teeth on the chamfer, the amount of stock left on the work piece by the cutting teeth for displacement by the burnishing teeth being determined by the difference in the diameter of the crest of the working section of the burnishing teeth and the diameter of the line of intersection between the projected chamfer cone and the projected outer diameter of the forward relief section where such line of intersection is intersected by the side of the flute.

It is another object to provide a combination cutting and burnishing tap for forming internal screw threads in which the thread is cut so as to leave stock only at the major diameter of the thread for displacement by burnishing.

It is another object to provide a combination tap of the type described in which the thread is cut so as to leave stock along both the flanks and major diameter of the thread for displacement by burnishing.

It is another object to provide a cutting and burnishing tap in which the root diameter of the burnishing teeth contacts the thread being formed in the work piece to shape and size the minor diameter thereof.

Figure 3:
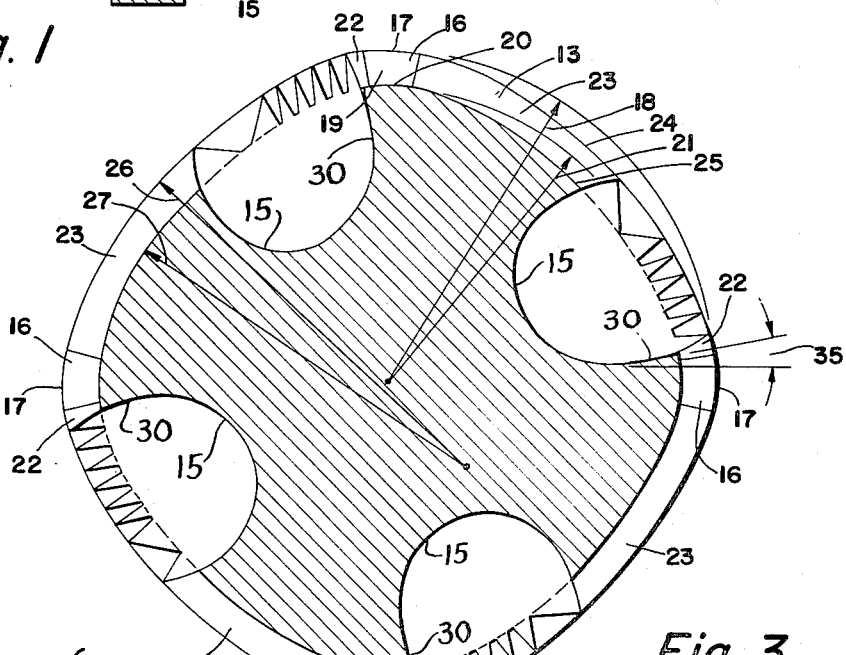
Figure 2:
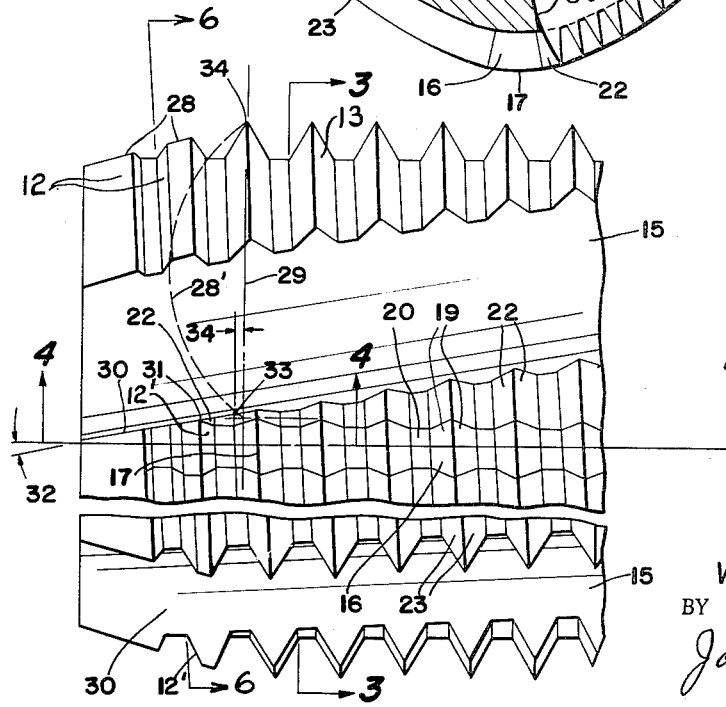
Figure 4:
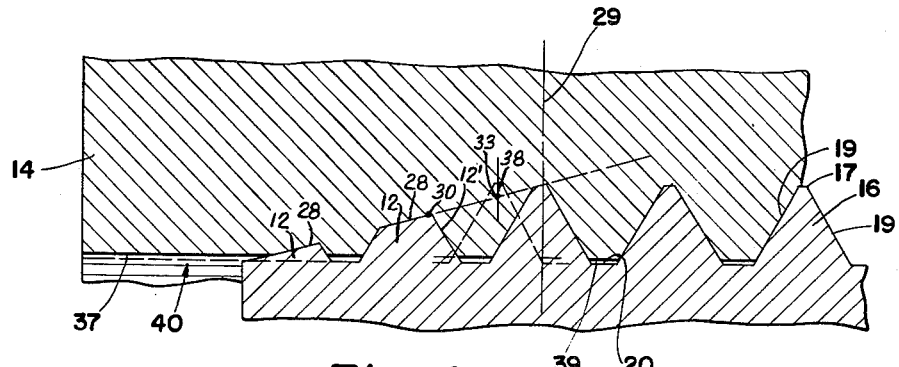
Figure 5:
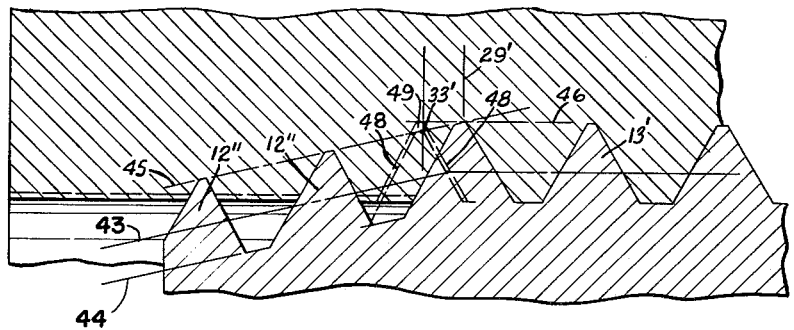
Figure 6:
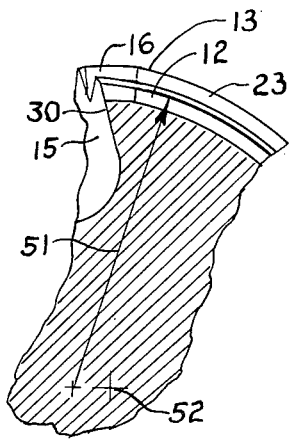

Other objects of the invention will be apparent from the description and from the drawings in which:
 FIG. 1 is a longitudinal view of the tap with a work piece which is shown in cross section,
 FIG. 2 is a fragmentary enlarged side view of the tap,
 FIG. 3 is a cross section view along the lines 3—3 of FIG. 2 showing the outline of the burnishing teeth.
 FIG. 4 is a further enlarged fragmentary cross section of the tap and a work piece along the lines 4—4 of FIG. 2,
 FIG. 5 is a view similar to FIG. 4 of a modified form of the invention,
 FIG. 6 is an enlarged fragmentary section view along the lines 6—6 of FIG. 2 illustrating the outline of the cutting teeth in one form of the invention.

Tap 10 has a series of cutting teeth, generally designated 12, at its forward end followed by a series of burnishing teeth generally designated 13 for forming threads in a work piece 14. All of the teeth follow a helical path which is interrupted by generally longitudinally extending flutes 15 spaced about the circumference of the tap and extending below the root diameters of the cutting and burnishing teeth.

As shown in FIGS. 2 and 3, the burnishing teeth 13 each have a working section 16 with a crest or major diameter 17 formed on a radius 18 from the axis of the tap and corresponding to the radius of the major diameter of the thread to be formed in the work piece. The working sections 16 have flanks 19 on each side thereof tapered in cross section and of a size for forming threads of proper size in the work piece, the cross sections of working sections 16 in all radial planes being identical in size and shape.

The root 20 of working sections 16 are on a radius 21 which may be the same as, or very nearly the same as, the radius of the root of the thread to be formed, it being preferred that the root 20 be of a diameter such that there will be from 95 to 100% fill of the valley between the crests 17 of the axially adjacent working sections 16 by the work piece thread.

On the lead side of each working section 16 of the burnishing teeth, assuming that the tap is to be rotated in a counter clockwise direction as viewed in FIG. 3, is a relief section 22, and there is another relief section 23 on the trailing side of each working section 16. The relief sections 22 are separated by flutes 15 from the helically preceding relief sections 23 in the fluted portion of the tap but are joined therewith in the unfluted portion. The crest 24 and roots 25 of these relief sections decrease radially from a diameter where they merge with the crests 17 and roots 20 of the working sections to smaller diameters where they are intersected by the flutes. Thus relief crests 24 and relief roots 25 are on radii 26, 27, respectively, which are larger than the corresponding working section radii 18, 21.

In this manner the leading and trailing ends of the flanks, roots, and crests of relief sections 22, 23 of the burnishing teeth are out of contact with the thread being formed in the work piece while the entire extent of working section flanks 19 and crests 17 are in contact with the work piece. Portions of certain relief sections 22, 23 adjacent the working sections 16 are also in contact with the work piece, as hereinafter further explained.

In one form of the tap, as illustrated in FIGS. 2 and 4, the root radii 21 and 27 of the working and relief sections respectively are the same throughout the length of the tap. However, the crests of the thread formed at the front end of the tap are chamfered as at 28, preferably at an angle of from 10 to 20°. The cone of chamfer 28 intersects the projected cylinder containing the crests of working sections 16 at a transverse plane indicated by line 29. Flutes 15 traverse the chamfered thread form and at least part of the unchamfered thread to form cutting teeth 12 and burnishing teeth 13. Edges 30 of the flutes, which form the lead edges of the teeth, are at an angle 32 with the longitudinal axis of the tap. It has been found that an angle of from 10 to 12° produces very good results.

Flute edges 30 are so located that they intersect the line of intersection 28' between the projected cone of chamfer 28 and the plane through the crests of relief sections 22 at points 33 spaced axially of the tap a predetermined distance 34 from line 29. This distance determines the amount of stock left on the threads of the work piece by the cutting teeth to be displaced by the burnishing teeth. Flute edges 30 also intersect the chamfered crests of working sections 16 axially between points 33 and the forward end of the tap at points 31. Flute edges 30 are preferably ground to a hook angle 35 of from 12 to 15° and to a depth below the root diameters of the tap.

The tap is preferably initially formed without either flutes 15 or chamfer 28. At this stage the thread on the tap is a continuous helix and with alternating working sections 16 and relief sections 22, 23. Subsequent forming of flutes 15 and chamfer 28 as above described cuts away the relief section 22 of the thread on the lead side of the teeth located forwardly of points 31 so that the lead edges of these teeth are formed in working sections 16 and act as cutting edges for cutting the thread form in the work piece. These cutting teeth forwardly of points 31 are identified by numeral 12. When the chamfered crests 28 of the cutting teeth are not relieved there is a slight amount of burnishing done by the crests of teeth 12 between the lead and trailing edges thereof due to the slight increase in diameter between such leading and trailing edges resulting from the thread helix moving up the chamfer cone. If desired, this burnishing action may be eliminated by relieving the chamfered crests as indicated by radius 51 in FIG. 6, whose center is displaced from the axis 52 of the tap, as shown.

Flute edges 30 intersect crests 17 of working sections 16 at points 31 on chamfer cone 28 and thus the teeth beyond points 31 have relief sections 22 on their lead sides, the length of these relief sections gradually increasing from points 31 on. The teeth between points 31 and 33, which are designated 12', cut at their crests even though their lead edges are formed in the relieved portions 22 because the crests are chamfered to a diameter below that of the initial diameter of the crests of the relieved portions at such lead edges. As with teeth 12, there is a slight burnishing action by the crest portion of teeth 12' following the lead edges unless these crests are relieved in the manner indicated by radius 51 in FIG. 6.

There is also a slight burnishing action along the flanks of teeth 12' between the crest diameter of the lead edge of a given tooth and the largest diameter of the crest of the helically preceding tooth but not on the remaining portion of the flanks because such remaining portion has already been formed to size by the preceding teeth.

Axially beyond points 33 the crest diameter of the relieved portion 22 of each tooth is less than the largest crest diameter of the helically preceding tooth so that the lead edges of the crests of these teeth clear the track made in the work piece by the preceding tooth and thus do not cut. However, the crests of these teeth increase in diameter between the lead edges of working sections 16 so that between points 33 and line 29 the crests make contact with the work piece thread major diameter between the lead edge and the working section whereby the work piece thread major diameter is burnished to the diameter of the working section. Beyond line 29 it is only the working sections 16 which contact the thread being formed, except that if there is any back flow or spring back of metal from the work piece after being traversed by a full size working section 16 beyond line 29, the next succeeding relief section 22 will contact it near the associated working section 16 to reburnish it back to size.

In the form of tap shown in FIGS. 2 and 4 the cutting teeth forwardly of points 33 cut the threads in the work piece to proper size, except for the major diameter, since the thread form of these teeth below the chamfered crests is to size. However the threads in the work piece as formed by the tap teeth in advance of points 33 do not have the highly smooth finish that is desired since they have been formed by cutting action.

When the tap tooth located at point 33 (shown in dotted outline in FIG. 4) enters the work piece there is still remaining a small amount of metal (indicated at 38) at the major diameter of this work piece thread which is displaced by the already described swaging or burnishing action of the tap teeth beyond point 33. Such displaced metal fills in the low spots of the relatively rough finish on the flanks and permits the burnishing teeth to rub the work piece thread flanks to a very smooth finish. Displaced metal not required for this purpose is compacted along the major diameter and flanks to provide a layer of denser, work hardened material. In cases where the opening 37 in the work piece is initially slightly greater in diameter than the root diameter 20 of the tap, any additional excess of displaced material from region 38 will cause a slight decrease in the minor diameter of the work piece thread, as indicated at 39. This decrease may be slightly greater at the edges of the root than at the center thereof so that the root is not perfectly flat. In many cases this is not objectionable.

As indicated by dotted line 40 in FIG. 4, the initial diameter of the opening in the work piece may be the same (or even smaller) than the root diameter 20 of the tap. In such case the minor diameter of the work piece thread contacts the root of the tap and conforms to its outline so that the work piece minor diameter is flat and to the desired size.

It has been found that it is relatively easy to displace the metal at 38 in FIG. 4 by the burnishing teeth as aforesaid so that there is no great additional strain placed upon the tap by the burnishing action and consequently tap breakage seldom occurs.

FIG. 5 illustrates an optional method of constructing the front or cutting section of the tap. In this form the pitch and root diameters 43, 44 of cutting teeth 12", as well as the crest diameter 45, are tapered as shown. Teeth 12", as well as the succeeding burnishing teeth 13', are formed with working and relieved sections corresponding to working and relieved sections 16, 22, and 23, respectively of the form of tap illustrated in FIGS. 2 and 4. The projected cone of crest diameters 45 of working sections 16 in the tapered area intersect the projected cylinder 46 of the crest diameter of the untapered working sections 16' in a plane indicated by line 29'. In this case, each cutting tooth 12" cuts along its flanks as well as at its crest. At point 33' (corresponding to point 33 of FIG. 4 where cutting action ends) there remains a thin layer of metal on the flanks of the work piece thread, as well as at the major diameter, to be displaced by the burnishing action of the succeeding teeth of the tap. As before, each cutting tooth 12" may be relieved at its crest back of the cutting edge, as well as at its flanks, in the manner indicated by radius 51 in FIG. 6, if so desired.

The metal for displacement on the flanks and crest is indicated at 48, 49, respectively, between the dotted tooth outlines, the inner one of which represents the tap tooth working section 16 at this location and the outer one of which represents the finished thread in the work piece. The succeeding teeth on the tap displace the metal indicated by 48, 49 by burnishing action, the displaced metal serving to fill minute depressions and irregularities on the tooth flanks and to provide for compacting and work hardening of a layer of metal along the tooth flanks. As before, any excess metal is displaced to the root of the thread in those instances where the opening in the work piece is initially smaller in diameter than the diameter of the root of the working section of the burnishing teeth.

It has been found that with taps made in accordance with this invention threads of 80% or more of full depth may be made in hard materials such as stainless steel, whereas threads formed only by swaging can seldom, if ever, be produced with more than 60% of full depth in such materials.

Because of the angle 32 to which edges 30 of the flutes are formed, the chips produced by cutting teeth 12, 12′, and 12″ will be propelled forwardly away from burnishing teeth 13, 13′. Although both sides of the flutes are shown at an angle corresponding to 32, it is only necessary that the edge 30 where it traverses the cutting teeth need be at this angle. Thus, edge 30 beyond points 33, and the opposite edge of the flute, may be parallel with the axis of the tap. Also, the flutes may extend only a short distance beyond lines 29, 29′, or may extend throughout the entire threaded portion of the tap. In either case, the portion of the flutes beyond lines 29, 29′ is preferably located so as to cut across only the relieved portions of the thread form between circumferentially adjacent working sections of the burnishing teeth 13, 13′.

In the foregoing description and in the claims the term burnishing may be considered to be synonymous with the operation sometimes referred to as swaging and has reference to movement or displacement of metal on the work piece as contrasted with removal or cutting away of metal from the work piece.

Although several forms of the invention have been illustrated and described it is obvious that other modifications may be made without departing from the scope of the invention as defined by the claims.

I claim:

1. A tap having helically successive cutting teeth at one end thereof of a size for cutting a thread in a work piece with at least a part of the thread being smaller in size than the desired finished size, a burnishing portion on the tap which includes working sections of a size to engage the undersize thread in the work piece for burnishing it to the finished size, said burnishing portion also including relief sections helically in advance of the working sections and merging therewith, said relief sections decreasing from a size corresponding to that of the working sections to a smaller size, the crests of the cutting teeth having a chamfer angle which describes a cone having a first line of intersection with a circular plane in which the crests of the working sections lie and having a second line of intersection with a plane in which the crest of at least one of the relief sections lies, at least one flute in said tap, one side of said flute forming cutting edges on said cutting teeth, said side of the flute intersecting said first line of intersection at a first point and intersecting said second line of intersection at a second point which lies axially between said first point and said end of the tap, the difference in the radial distances between the axis of the tap and each of said points determining the amount of stock left in the work piece by the crests of the cutting teeth to be burnished by the crests of the working sections.

2. A tap in accordance with claim 1 in which the crests of the cutting teeth are relieved back of the cutting edges whereby the cutting teeth contact the work piece at their cutting edges only.

3. A tap in accordance with claim 1 in which the root diameters of the cutting teeth are also formed on a chamfer angle corresponding to the chamfer angle of the crests of the cutting teeth whereby the flanks as well as the crest of the work piece thread are cut undersize by the cutting teeth and burnished to size by the working sections.

4. A tap in accordance with claim 1 wherein said cutting teeth are also provided with working sections which are intersected by the edge of said flute to form said cutting edges, the continuation of said flute edge intersecting the relief sections of said burnishing portion.

5. A tap in accordance with claim 1 wherein said cutting teeth also include working sections and relief sections, said flute edge intersecting the chamfered crests of said cutting teeth working sections from a third point axially forwardly spaced from said second point to the forward end of said tap to form cutting edges thereon, the continuation of said flute edge intersecting the relieved portions of said cutting teeth between said second and third points to form lead edges thereon, the crest diameters of such cutting teeth relieved portions between said second and third points being greater than the largest diameter of the crest of the helically preceding tooth, whereby said lead edges also constitute cutting edges.

References Cited by the Examiner

UNITED STATES PATENTS

| | | | |
|---|---|---|---|
| 1,447,700 | 3/1923 | Wells | 10—141 |
| 1,912,491 | 6/1933 | De Lapotterie | 10—152 |
| 2,165,011 | 7/1939 | Rosenberg | 85—47 |
| 2,991,491 | 7/1961 | Welles | 10—152 |
| 3,104,161 | 9/1963 | Carlson | 10—152 |

OTHER REFERENCES

N 5,903 X 11–47a 10–1956, German Printed Application to Schlotter (1 sht. dwg.; 3 pp. spec.).

ANDREW R. JUHASZ, *Primary Examiner.*